(12) United States Patent
Larsson et al.

(10) Patent No.: US 8,473,142 B2
(45) Date of Patent: Jun. 25, 2013

(54) METHOD AND ARRANGEMENT FOR CALCULATING A CONFORMITY BETWEEN AN ESTIMATED REPRESENTATION OF AN ENVIRONMENT AND THE ACTUAL ENVIRONMENT

(75) Inventors: Johan Larsson, Örebro (SE); Michael Krasser, Rättvik (SE)

(73) Assignee: Atlas Copco Rock Drills AB, Orebro (SE)

( * ) Notice: Subject to any disclaimer, the term of this patent is extended or adjusted under 35 U.S.C. 154(b) by 341 days.

(21) Appl. No.: 12/736,935

(22) PCT Filed: May 28, 2009

(86) PCT No.: PCT/SE2009/000274
§ 371 (c)(1),
(2), (4) Date: Nov. 22, 2010

(87) PCT Pub. No.: WO2009/145695
PCT Pub. Date: Dec. 3, 2009

(65) Prior Publication Data
US 2011/0066313 A1 Mar. 17, 2011

(30) Foreign Application Priority Data
May 30, 2008 (SE) ........................ 0801277

(51) Int. Cl.
*G01C 22/00* (2006.01)
(52) U.S. Cl.
USPC .......... 701/25; 701/32.9; 701/33.6; 701/408; 340/435

(58) Field of Classification Search
USPC ................. 701/25, 32.9, 33.6, 408, 520, 527, 701/530; 340/426.19, 435, 438
See application file for complete search history.

(56) References Cited

U.S. PATENT DOCUMENTS

| 6,393,370 B1 | 5/2002 | Soika |
| 6,415,221 B1 | 7/2002 | Egberts |
| 7,103,460 B1 * | 9/2006 | Breed .......................... 701/32.9 |

FOREIGN PATENT DOCUMENTS

| DE | 19948734 | 4/2001 |
| DE | 102005008185 | 8/2006 |

(Continued)

*Primary Examiner* — Gertrude Arthur Jeanglaude
(74) *Attorney, Agent, or Firm* — Mark P. Stone (57) ABSTRACT

The present invention concerns a method for determining a conformity between a representation of an environment and said environment, wherein said representation of the environment constitutes a representation in at least two dimensions, where a distance between two points in the representation has a known relation to the corresponding distance in said environment, characterized in that said determination involves the step of determining a first set of parameter values for a first position in said representation of the environment, comparing said first determined set of expected parameter values with a second set of parameter values, where said second set of parameter values has been determined for a second position, where said second position constitutes a position in said environment that essentially corresponds to said first position, and using said comparison to determine a measure of conformity between said environment and said representation of the environment. The invention also concerns an arrangement and the mining and/or construction machine.

20 Claims, 5 Drawing Sheets

U.S. PATENT DOCUMENTS

| | | | |
|---|---|---|---|
| 7,421,321 B2 * | 9/2008 | Breed et al. | 701/33.6 |
| 2004/0254727 A1 * | 12/2004 | Ockerse et al. | 701/224 |
| 2005/0283699 A1 | 12/2005 | Nomura et al. | |
| 2007/0021908 A1 | 1/2007 | Jaugilas et al. | |
| 2007/0027612 A1 | 2/2007 | Barfoot et al. | |
| 2007/0198177 A1 | 8/2007 | Yamada | |
| 2007/0293985 A1 | 12/2007 | Myeong | |

FOREIGN PATENT DOCUMENTS

| | | |
|---|---|---|
| JP | 11305833 | 11/1999 |
| WO | WO 02/093282 | 11/2002 |
| WO | WO2006/101012 | 9/2006 |
| WO | WO2007/012198 | 2/2007 |
| WO | WO2007/012199 | 2/2007 |

* cited by examiner

Fig. 5

METHOD AND ARRANGEMENT FOR CALCULATING A CONFORMITY BETWEEN AN ESTIMATED REPRESENTATION OF AN ENVIRONMENT AND THE ACTUAL ENVIRONMENT

TECHNICAL FIELD

The present invention concerns verification of a representation of an environment, and a method to verify a representation of an environment. The invention also deals with an arrangement and a mining and/or construction machine.

PRIOR ART

In many fields there is a constant process of improving the efficiency, productivity and safety, one of which is underground mining. One area in such mining where changes/improvements are taking place to accomplish the above involves automating certain functions for at least some of the vehicles/machines used in the mine. For example, it is desirable that certain machines, such as loading machines, be automatically driven, that is, not only can the machine be driven without a driver, but it can also perform functions totally by itself.

On example of such vehicles where automated operation is desired consists of so-called LHD (loading, hauling and dumping) machines. These machines are often used to remove broken rock, haul it to a particular place where the broken rock is dumped, whereupon the machine returns to the same place for a new load. Thus, these machines often perform the same manoeuvres over and over again, which makes this type of machine/manoeuvre especially well suited to automation.

These machines were previously driven manually by a driver on board the machine or by means of radio control, for example. Due to factors such as driver safety, risk of accident, and labour expenses, however, it is desirable to move such loading machines in an entirely automatic fashion.

One type of existing system to achieve such a fully automatic operation is based on a three step principle, where the machine in a route recording step is first driven manually on the course that will later be driven autonomously, at the same time as signals from various transmitters arranged on the machine are recorded. In step two, a route is generated to create, on the basis of at least some of the above recorded transmitter signals, a system of co-ordinates, covering the region in which the machine will be moving. The route driven by the machine during the recording is described in this system of co-ordinates along with information on, e.g., the suitable speed for various parts of the route. Furthermore, with the help of the transmitter information, a map representation can be created for the pathways in the tunnels where the machine is moving, if such were not previously available.

The third step consists of playback, wherein co-ordinate information as to how the machine was moved manually and a representation of the surroundings is used to move the machine autonomously along the same path that the machine travelled manually in step one.

During autonomous playback (tramming) of a route, the machine's position in the system of co-ordinates in which the representation of the surroundings and the desired route of travel are defined is determined, e.g., by estimation.

The representation of the surroundings used to find the position can consist of a map representation of the paths in the tunnels in which the machine will be moving autonomously, and it can be generated beforehand or by means of the above described transmitter information that is collected. If the maps are generated based on data from the route recording, the system of co-ordinates can be assumed at the beginning to consist entirely of rock, but then portions of rock are "erased" where range scanners on the machine detect a free path (alternatively, a clean map can be used, where the distances measured by the range scanners are used to generate line segments representing rock walls and other obstacles). When the route generating reaches an end, a representation will thus have been generated.

Regardless of how the representation of the surroundings is generated, it is very important in systems of the above type that this be a correct description of the surroundings, since if for some reason it is a poor representation of how the surroundings actually appear in corresponding parts of the route there is a risk of the machine getting lost or being driven wrong and causing damage to the machine or the surroundings.

The processes used to generate such representations of the surroundings can be complicated and much can go wrong. As noted above, the map generation can be based on transmitter information from many different transmitters. Examples of such transmitters are middle angle transmitters, transmitters of distance travelled, and one or more laser range scanners. The map material might be defective, e.g., because one or more of the sensors used to generate the map put out faulty signals, such as faulty distance and/or directions. In some cases, one can even use information from a gyro measuring the machine's direction of travel, in which case a faulty gyro can put out faulty signals. Moreover, the surroundings where the route is recorded may be such that the quality of representation of the surroundings is poor, for example, objects or surfaces may occur which absorb or reflect the light from the laser range scanners.

For this reason, it is important to verify that the generated representation of the surroundings indeed conforms to the reality. However, this verification is very hard to do, and normally takes a very trained eye to identify mistakes on the map, yet even then it is not certain that all deficiencies have been found.

Thus, there is a need for an improved method of verifying that a representation of the surroundings in fact agrees with how the surroundings really appear.

SUMMARY OF THE INVENTION

One purpose of the present invention is to provide a method to verify a representation of an environment that solves the foregoing problems.

The present invention pertains to a method and an arrangement for calculating a conformity between a representation of an environment and said environment, wherein said representation of the environment constitutes a representation in at least two dimensions, where a distance between two points in the representation has a known relation to the corresponding distance in said environment. The method involves using a mathematical model of a vehicle, and on the basis of stored data, to estimate a first position for a point on the vehicle in said representation of the environment and, for said first estimated position in said representation of the environment, to calculate a first set of expected parameter values. Moreover, the method involves comparing said computed first set of expected parameter values with a second set of stored parameter values, where said second set of stored parameter values has been determined for a second position, where said second position constitutes a position in said environment that essentially corresponds to said first estimated position. Furthermore, the method involves using said comparison to compute a measure of conformity between said environment and said representation of the environment.

The invention has the advantage that the reliability of a representation of an environment can be determined in easy manner, e.g., by comparing distances to obstacles in different directions from a point in the representation with corresponding distances to obstacles such as walls in corresponding directions in the actual environment. If the conformity between the distance is good, one can also assume that the conformity of the representation with the reality is good. Moreover, the invention has the advantage that the verification of the maps is a fast process.

The invention also pertains to an arrangement and a mining and/or construction machine.

BRIEF DESCRIPTION OF THE DRAWINGS

The invention will be explained in more detail by describing various embodiments thereof, based on the accompanying drawings, where FIG. 1 A, B, is a vehicle from the side and top, respectively, in which the present invention can be used to advantage.

FIG. 3 A, B, is an example of two maps of the same area, generated by the same algorithm.

DESCRIPTION OF ALTERNATIVE EMBODIMENTS

Figure 1A:
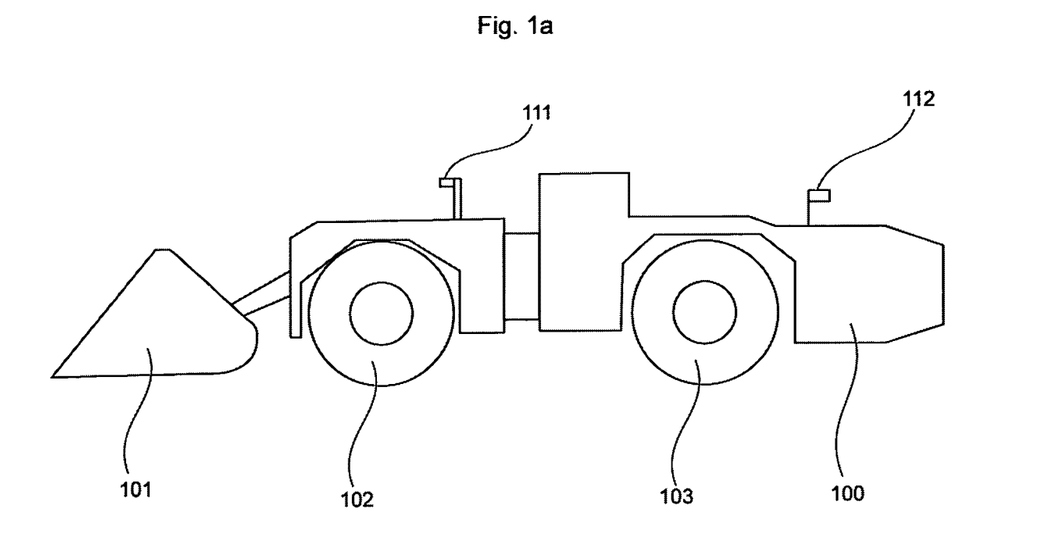
Figure 1B:
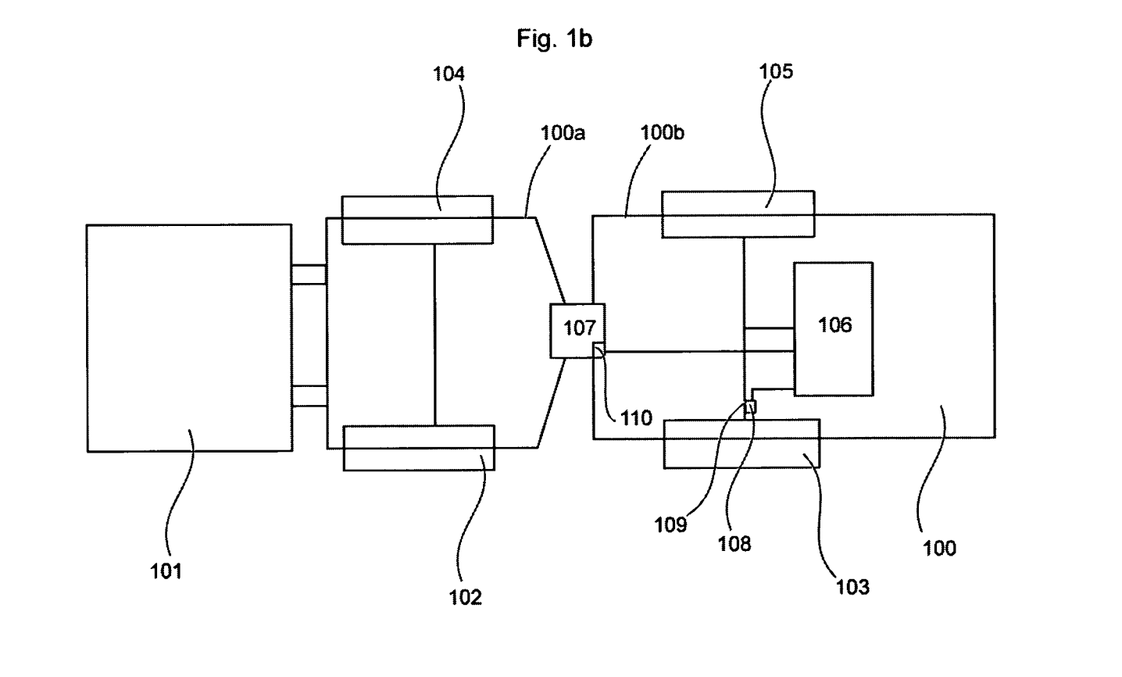

FIG. 1 A, B, shows a vehicle 100 from the side and top, respectively. The vehicle 100 is part of a loading machine in which present invention can be used to advantage. The machine 100 comprises a bucket 101 and wheels 102-105, and a control unit 106, which controls various functions of the machine 100. As shown in FIG. 1*b*, the machine is part of an articulated vehicle, whose front section 100*a* is joined to a rear section 100*b* via a joint 107. The machine also comprises at least one wheel rotation sensor 108, such as an odometer, which can be arranged on the axle emerging from the transmission and puts out signals representing the drive wheel's rotation and/or distance travelled. In an alternative embodiment, one can use a sensor arranged on the machine's drive axle 109, which puts out signals representing the rotation of the drive axle 109 and, thus, the drive wheel. The sensor 108 puts out signals to the control unit 106. Moreover, arranged at the joint 107 is a joint angle sensor 110, which measures the current joint angle and sends these signals to the control unit 106.

The machine 100 further comprises a front 111 and a rear 112 laser range scanner, which is also connected to the control unit 106 and puts out sensor signals representing measured distance, i.e., distance to the closest obstacle which stops the path of the laser beam. The laser range scanners 111, 112 can be designed, e.g., to measure the distance in certain directions in an angle interval. The present example uses laser range scanners to measure the distance to the closest object in the forward longitudinal direction of the front section 100*a* (or the backward longitudinal direction of the rear section 100*b*) and the distance to the closest object (such as rock) for each whole degree±90° from the respective longitudinal direction. Thus, each respective laser range scanner measures the distance at 181 respective measurement points. As will be understood, one can use laser range scanners which measure distance in significantly more directions, as well as those which measure distance in significantly fewer directions. One can also use a single omnidirectional laser instead. In an alternative embodiment, one uses only the scanner which happens to be "pointing" in the direction of travel (i.e., the front one 111 if the vehicle is moving forwards and vice versa). It is in no way essential to the invention for the directions to be measured by laser range scanners, but any desired range-finder can be used, as long as it can provide distance measurements with acceptable accuracy. Examples of other type of conceivable range-finder are those based on radar or sonar technology.

Moreover, the sample embodiment shown here uses a range scanner to measure distance in only one plane (the horizontal plane of the machine). Yet it will be obvious that range scanning can occur in more than one plane, e.g., also in a vertical plane to measure tunnel or local height, or another plane lying between the horizontal and vertical plane, thereby refining the possibilities for a correct position estimation. In yet another alternative embodiment, one or more scanners pointed at the sides can be used instead or in addition.

Moreover, the aforesaid sensors put out sensor signals to the control unit 106 at appropriate times, such as continuously or every 40 ms or more often or more seldom. The control unit 106 then uses the signals received as will be described below.

Figure 2:
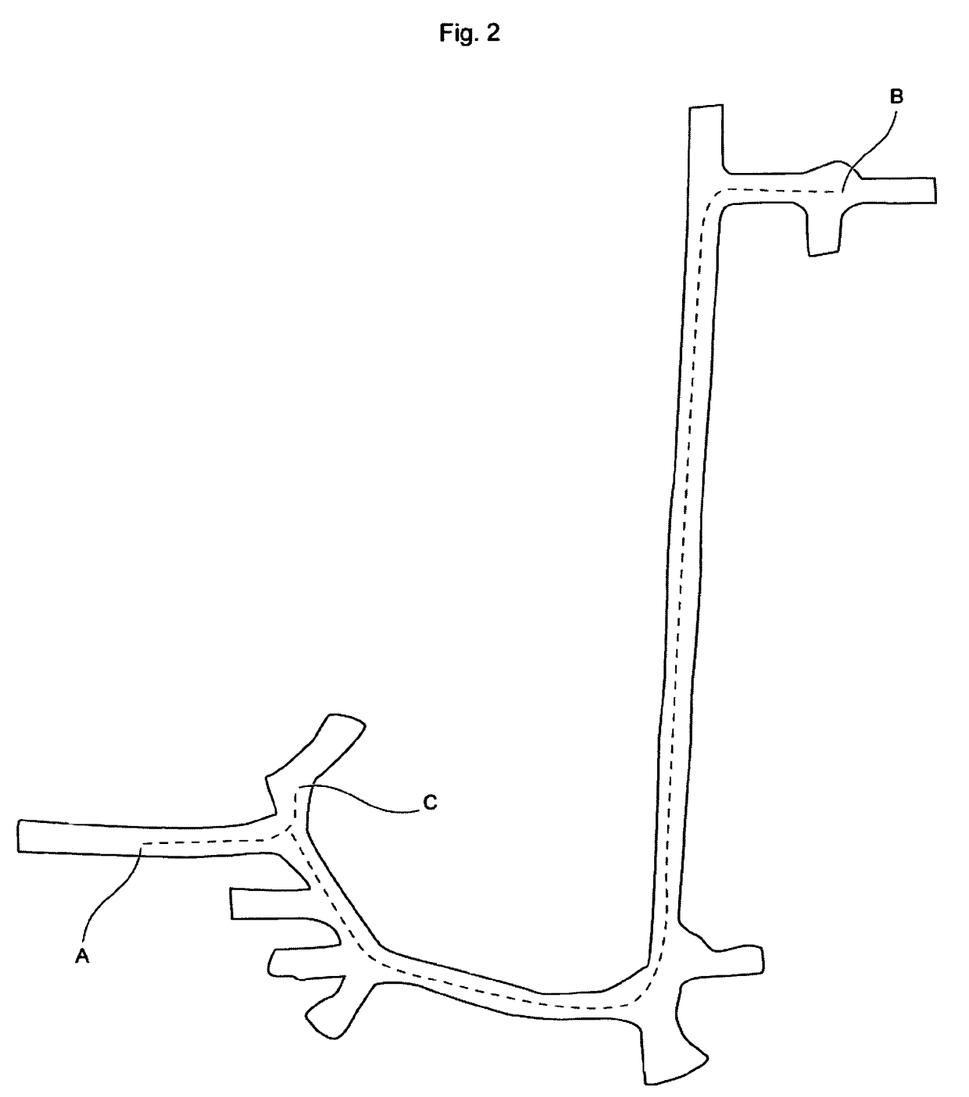
FIG. 2 is an example of a mine where the present invention can be used to advantage.

FIG. 2 shows an example of a mine where the present invention can be used to advantage. In the example shown, the vehicle 100 uses the bucket 101 to load rocks at site A and then hauls the load for dumping at site B. When the machine 100 is set up for autotramming, the above described three-step principle can be used, i.e., a route recording is first done, where a recording of signals from the above sensors is activated.

The loading, hauling, dumping and return procedure can be designed to run as a single route, or one can configure the movement from A to B as a first separate route and the movement from B to A as a second separate route. Thus, the sensor signal recording is activated for recording of a route from A to B, whereupon an operator with the vehicle parked at point A backs up to point C and turns the vehicle around, whereupon hauling along the broken line is then done to point B, where the route recording is stopped.

Based on the recorded transmitter signals the route is then created, i.e., how the vehicle should be moved and at what speed the vehicle should be moved on different parts of the route. As mentioned above, the sensor signals can be read off every 40 ms, for example. If each sensor signal reading will constitute a route point, the number of route points becomes very large. For this reason, the route points can instead be signals determined for every half meter of the machine's movement, for example. The data stored for the route is preferably the position, the vehicle's direction and desired speed. One thus gets a route which in theory consists of a number of points, indicating for each point where the vehicle is supposed to be, what direction it should have, and the speed it should be moving at in the subsequent autotramming.

When the vehicle is then moving autonomously on the route, it is normally not enough, as mentioned, to just use this information to carry out the desired movement, for example, because uncertainty in the sensor signals means that the end position in all likelihood will deviate from the calculated one, so that also the starting position for the next route will deviate from the original one. For this reason, one also uses a representation of the surroundings, such as route maps, in order to compare signals measured during autotramming with the map and thereby determine with more certitude the vehicle's position, and remedy uncertainties in the estimated position at regular intervals.

The representation of the surroundings (route maps) can be defined, e.g., in a system of co-ordinates which can advantageously be local for the specific route and which can also be created on the basis of the recorded sensor signals. Thus, the system of co-ordinates need only include the area where the machine will be moving, and it can have its origin at the point on the machine which constitutes the reference for the positioning when the recording is begun, such as the middle of the machine's front axle.

The path driven by the machine during the route recording can then be described in this system of co-ordinates along with information on, e.g., appropriate speed for different parts of the stretch.

The representation of the surroundings (the route maps) preferably includes information on which parts of the system of co-ordinates are broken up surfaces and which are rock. This can be generated beforehand, or by means of the transmitter information. The representation of the surroundings should consist of a representation in at least two dimensions, where a distance between two points in the representation has a known relation to the corresponding distance in said surrounding. An example is a metrical representation, i.e., a representation where a distance between two points in the representation is directly proportional to the corresponding distance in reality.

For example, one can use route maps of so-called "grid map" type. In this type of map, the region which the map represents is divided up into a network of routes, where each route can be connected with a certain property or a condition. The most usual type of grid map is an "occupancy grid map", where each route in the map can assume a condition of "empty" or "occupied". In a sample embodiment, the tunnels correspond to empty routes, while other routes, i.e., where rock or other obstacles are found, are occupied.

In the case that the maps are generated based on data from the route recording, the map can be assumed at the start, e.g., to consist entirely of rock, i.e., all the routes are occupied in a map of this type, but then rock portions are later "erased" whenever the range scanners detect a free path. When the route generation is finished, a representation corresponding to that in FIG. 2 will have been generated, which can then be used in subsequent route playback. Thus, one can say that, after the map has been generated, the condition of each route in the map is a function of measured distance of all laser beams that have gone through the route during the measurements. The map can be represented by a relatively fine-mesh route network, e.g., with a resolution of 1 cm or 1 dm per route.

As will be understood, other types of representations than "grid maps" can be used, e.g., one where rock walls are represented by line segments.

As mentioned above, one problem with such maps, regardless of type, is that the surroundings where the route is recorded can be such that the map's quality becomes poor, e.g., due to presence of objects or surfaces which absorb or reflect the light from the laser range scanners. Moreover, the map generating is based on transmitter information from many different transmitters, such as middle angle transmitters, transmitters to measure distance travelled, and laser range scanners, and in some cases also information from a gyro which measures the vehicle's direction of travel. If one or more of these transmitters puts out faulty information, the map will likely also be faulty. Furthermore, detailed geometrical information on machine design and transmitter placement on the vehicle is needed for the maps to be a relevant representation of the surroundings.

For this reason, it is important not to accept the map directly as it is, but to verify that the generated representation of the surroundings indeed conforms to the surroundings/reality. But this verification is hard to do, and generally requires use of a manual method to ensure the quality of the maps. This method assumes that each generated map is carefully examined and compared with the part of the surroundings around the recorded stretch being represented. This method has many major defects, the most important being that it requires a lot of knowledge about how the system works and good insight into the map representation, as well as detailed knowledge on how the surroundings appear around the recorded route. Thus, it normally takes a highly trained eye to identify faults in the map, but even this does not ensure that all defects are found. Moreover, the verification is time-consuming, since there may be many maps that need to be verified.

A route from point A to point B, as shown in FIG. 2, normally does not make use of a single map, as the figure indicates, but often the route maps consist of several consecutive map segments. The use of several map segments instead of a single map has the advantage that if one or more sensors is giving faulty signals during the map generating or putting out signals with great uncertainty in the precision, this will have significantly less impact if the error is "zero reset" with shorter intervals than if a single map is used, e.g., for the entire mine.

Figure 3A:
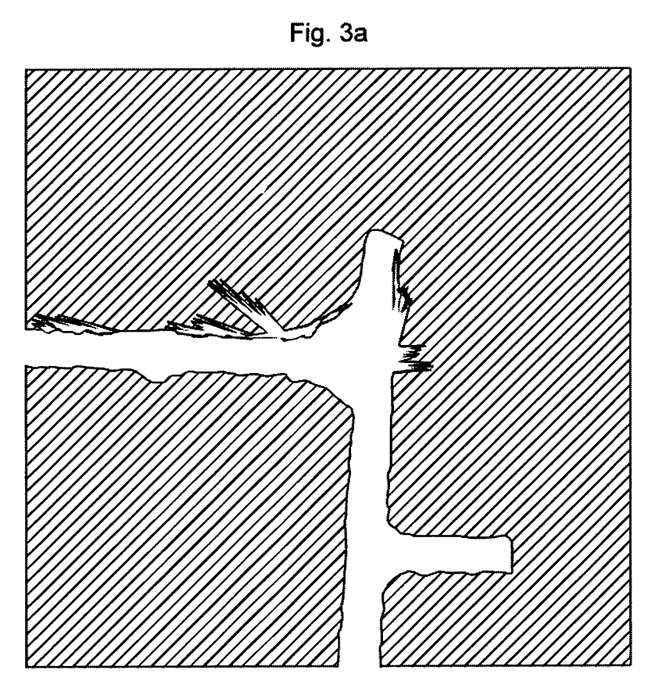
Figure 3B:
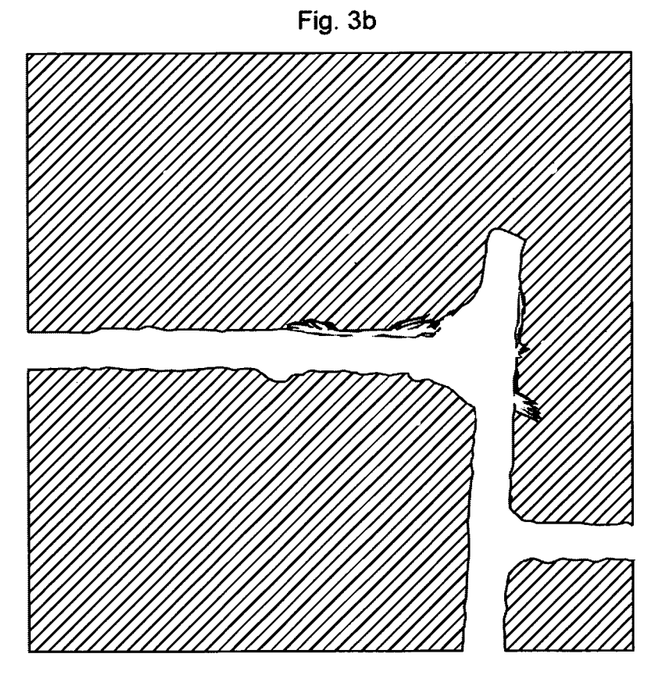

FIG. 3A-B shows an example of two maps for the same area and generated by the same algorithm. In the map of FIG. 3A, the environment contains surfaces that reflect away the light from the laser range scanners. When recording data for the one shown in FIG. 3B, these surfaces were removed. Even if certain of these defects can be easy for the trained eye to detect, it is far from certain that all errors will be found.

The present invention at least mitigates the above problem through an automated verification of the maps. By computing a measure for how well the maps agree with the recorded transmitter data, one can determine with a computer program whether the maps generated for a route are good enough to use during autonomous tramming.

The same information used to generate the maps can be used to verify that they are of good quality.

During the route generating, one calculates the movement of the machine based on the recorded information from the transmitters, while the progress in constructing the map is also guided by the machine's movement. Then a measure of the conformity of the maps to the reality is obtained by letting a mathematical model of the machine used in the route recording estimate its position on the map step by step in a simulated environment, based on recorded data from transmitters such as odometers, middle angle transmitters (or another transmitter, such as a steering angle transmitter for steerable front and/or rear wheels, e.g., if the machine lacks a middle angle, or in addition to the middle angle transmitter, to determine the change in direction of the machine; a gyro, for example, can be used to supplement the above middle angle transmitter or steering angle transmitter) and laser range scanners, and calculating for each step the expected transmitter signals from the machine's laser range scanners, e.g., in a subset of the directions in which measurements were taken during the route recording, along the entire recorded stretch, and comparing for the respective step the simulated laser data with the recorded laser data.

If the map is correct, the expected and the measured values from the laser range scanners will be in good agreement, and the difference between the expected and the measured value is thus a good measure of how well one or more maps represent the reality.

Figure 4:
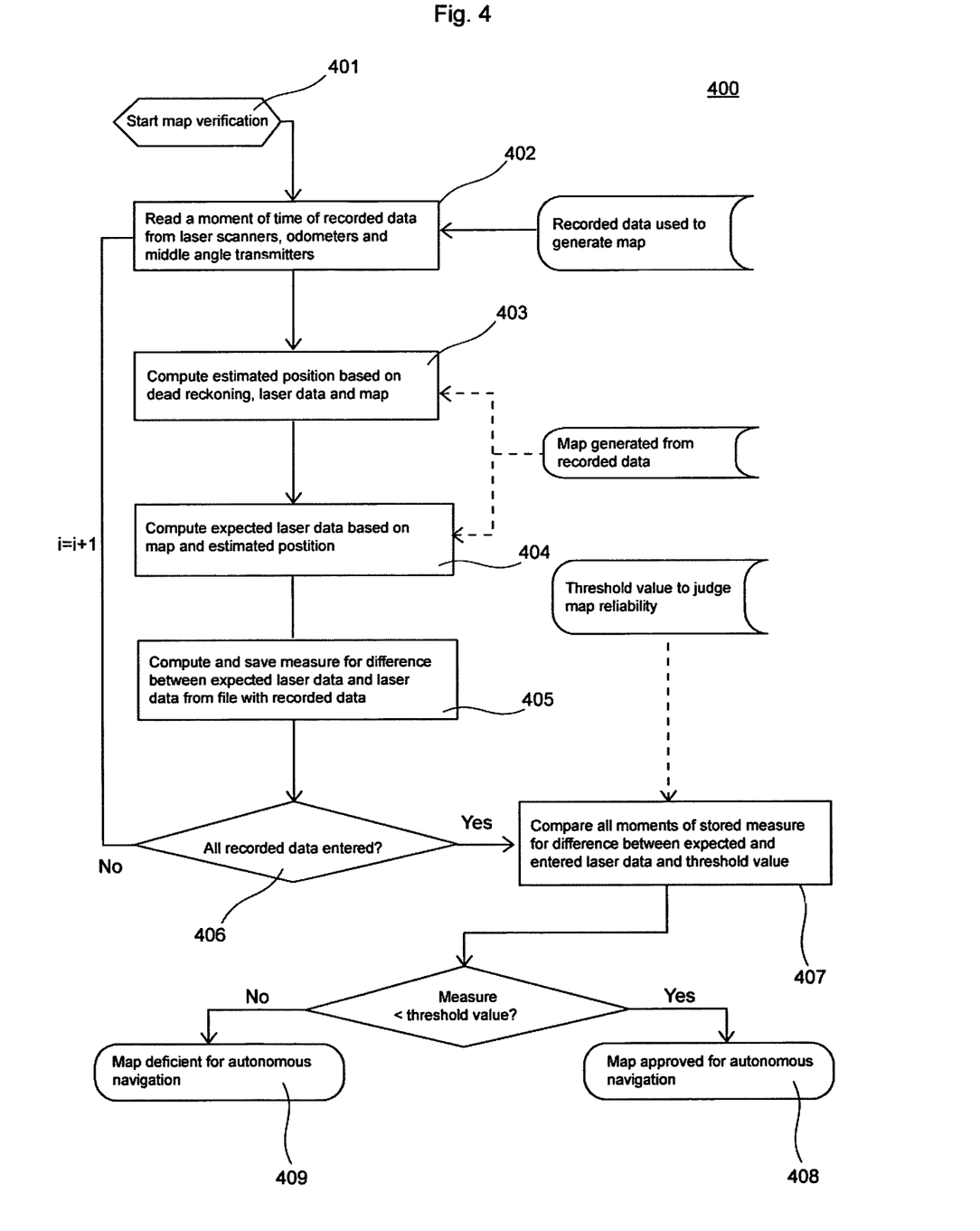
FIG. 4 is a schematic description of a method according to the present invention.

The invention will now be exemplified in more detail with regard to FIG. 4, which shows a sample method 400 according to the present invention. The process starts with step 401, where the verification of a generated map is started. As noted above, the verification is done in such a way that a model of the machine used in the route recording estimates its position step by step in a simulated environment, based on recorded data from transmitters such as odometers, middle angle transmitters and laser range scanners. Thus, in step 402, one enters the first moment of time i=1 of recorded data, i.e., the transmitter data recorded at the point when the route recording starts. The process then continues to step 403, where the simulated vehicle's position on the map is estimated based on dead reckoning, laser data, and the map. This laser data constitutes the data recorded during the route recording.

When estimating the position, a statistical filter such as a Kalman filter can be used. Preferably, one uses a so-called unscented Kalman filter, which uses a deterministic sampling technique.

The input signals to the Kalman filter is map data and the recorded signals from the middle angle transmitter (or the other types of transmitter used per above), the odometer and the laser range scanners. After this data has been fed in to the filter, the filter puts out an estimated position for the machine.

The process then goes on to step 404, where expected laser data based on map and estimated position is determined. The expected data from the laser distance scanners is calculated using the estimated position of the machine from the Kalman filter and the map(s) making up the route. For example, the calculation can be done by beam tracking (or another suitable method), that is, at the position estimated by the Kalman filter in a representation of the environment, in this case, the map, a simulated light beam's path is followed from a source (i.e., in this case, the scanner's estimated position on the map, which can differ from the machine's estimated position, since the machine's estimated position might be dictated by a determination of the middle of the front axle's position and not the laser's position, so that a correction has to be done for this case) until an obstacle halts its propagation.

In the present case, the obstacle halting the light beam is constituted by the tunnel walls on the maps and the result of a beam tracking of a single laser beam thus consists of the distance to the first wall on the map in the light beam's direction from the simulated light source's position (i.e., the position for the machine's laser range scanners when the machine is at the position estimated by the Kalman filter). This beam tracking can be done for any desired number of directions, e.g., it can be done for all the directions used in the route recording. In the present example, one uses 30 of the 181 directions used per above, which means that a beam tracking is thus done for every sixth degree of the laser range scanner's angle interval.

At step 405, one then determines an agreement between the expected distance as determined by beam tracking in the various directions and the corresponding distance actually measured from the laser range scanner. This can be done by determining how well the expected data agree with recorded data by comparing the expected value with the measured value, e.g., using the difference between expected and measured values. One way of calculating a measure of agreement between expected data and the data measured during the recording is to compute the RMS (root mean square) for the difference of expected and measured distance in the various directions, i.e., the mean value of the square root for the difference between expected and measured distance in the different directions. This can be done by equation 1, $$a = \sqrt{\sum_{i=0}^{n}(z_i - r_i)^2} \quad (1)$$

where a=measure of correctness of the position estimate, z=vector with recorded distance data from laser scanner, r=vector with expected distance data from laser range scanner (i.e., beam tracking data) corresponding to the vector z, and n=number of distance values being evaluated (in this case, 30).

Instead of using the RMS, one can of course use other methods to determine a measure of correctness of the position estimate. For example, one can use the sum of the absolute magnitude of the differences as a measure, i.e., $$a = \sum_{i=0}^{n}(|z_i - r_i|) \quad (2)$$

In cases where the map's agreement with reality is good, the measure determined at step 405 will be low, whereas inaccuracies in the map will result in a higher measure. Thus, the size of the measure will grow with increased error in the map representation and positioning estimation, while in the latter the error itself is a function of the correctness of the map.

When the measure a has been determined, the process goes on to step 406, to check whether all recorded data has been reviewed. If not, the process returns to step 402, where data for the next moment of time i=i+1 is entered, repeating the foregoing step for this moment of time.

When all data is reviewed, i.e., when a measure has been computed for each point of the route, the process goes on to step 407, where the measure found in step 406 is compared with a threshold value representing a maximum acceptable value for this measure. If the measure is less than the threshold value found for all measures so determined, the process goes on to step 408, where it is found that the map is approved for autonomous navigation. On the other hand, if one or more measures exceed the threshold value, the process goes on to step 409, where the map is rejected.

Thus, the present invention has a number of benefits. For example, it requires no extensive training of the person who will do the route generation. In theory, anyone at all can generate a route using simple instructions. The person doing the route generation also does not require detailed knowledge on the appearance of the area where the route was recorded. Furthermore, the present invention makes it fast to verify the maps, and the human factor can be in large degree ruled out, i.e., there is no risk that the person will forget to verify that the maps are good before playing back a route.

In certain cases, even slight mistakes in the generated map can give rise to large differences between expected distance and measured distance in certain directions, such as near corners/intersections or other conspicuous irregularities. For this reason, it may therefore be advantageous not to reject a map just because a single measure exceeds the threshold value, but rather one can calculate an intersection of the last x measures determined (e.g., 10, 20, 30, 50 or any other number), and as long as this average mean value is less than the threshold value the map can be deemed acceptable. But neither is the mean value of the number of measurements obtained for each step of the simulation a reliable measure of the map as a whole, since this measure does not show whether the map is very good in some places and worse in others. Therefore, another alternative is to use a filter, such as a minimum filter, where the lowest measure obtained during a certain time is returned. For example, the lowest measure of the last x measures (e.g., 10, 20, 30, 50 or any other desired number), or the measures determined during an interval of time, such as the last 2 seconds, or during a certain distance, can be returned from the minimum filter and then compared with the threshold value.

The threshold value, for example, can be found experimentally or theoretically, and it can also depend on the type of sensors on board the vehicle, how critical is the reliability of the map, and the nature of the environment (such as the width of the site in relation to the vehicle's width, the number of intersections the vehicle will pass along the route, and so on).

It should be understood that a route can consist of not just one, but a number of consecutive map segments, and the present invention works just as well regardless of how many maps are used for a route, or the type of map. This also means that some map segments along the route may be rejected, while others are accepted.

Moreover, the invention has been exemplified above in connection with a map generated during recording of sensor signals with a vehicle. But it is also conceivable to generate the map by entering, e.g., distances in a number of directions from one or more points by means of an instrument not mounted on a vehicle, or on a machine other than the one that will actually move autonomously. Moreover, the representation of the environment can be divided into a number of representations, and one or more representations can be designed to cover so small a portion of the environment that the representation can be verified from a single point, preferably by measuring the distance in a number of different directions from this point. Thus, the invention is not limited other than by what is stated in the accompanying claims.

Figure 5:
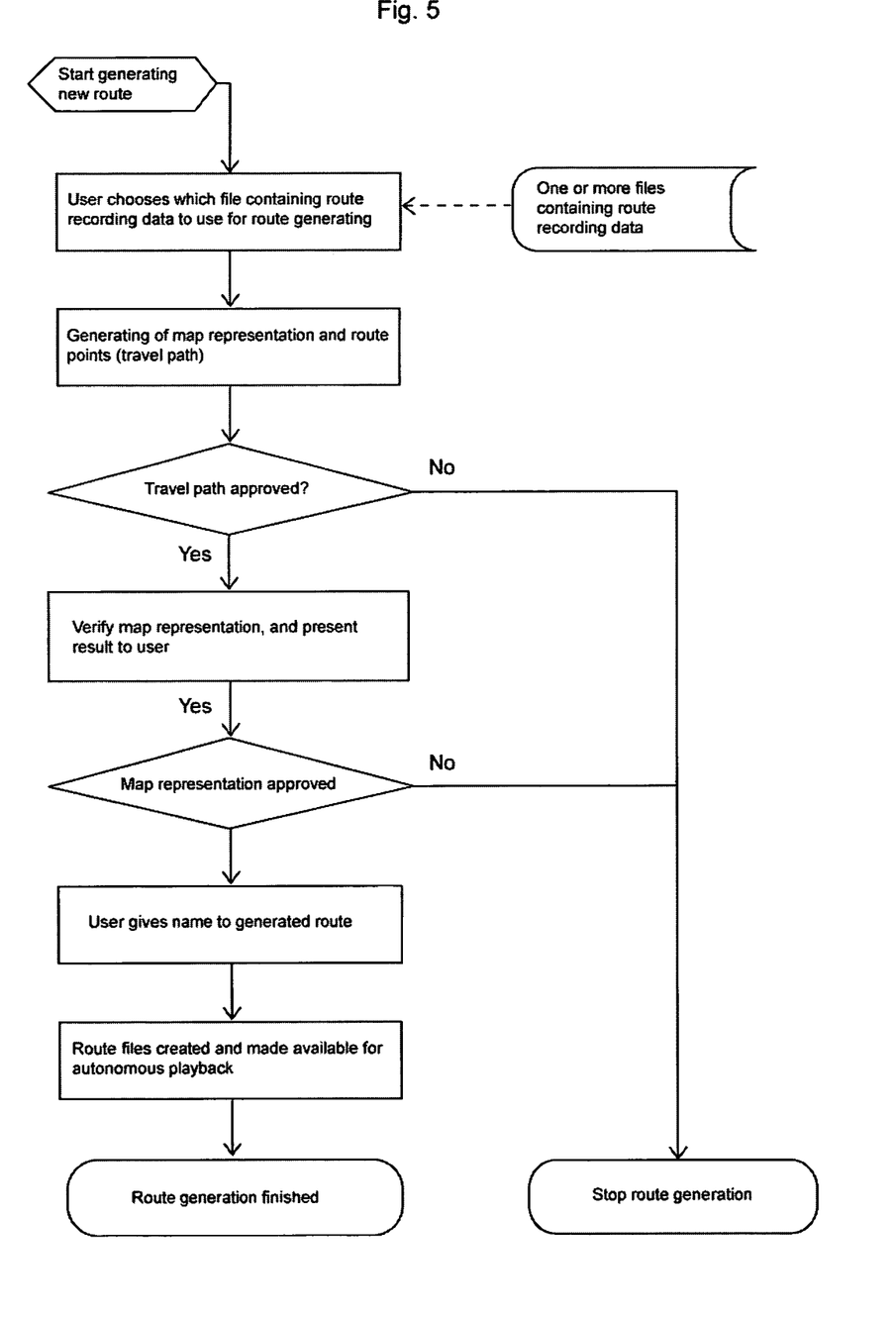
FIG. 5 is a schematic description of a method according to the present invention.

To guarantee that the method described here for verifying the quality of maps is always used when a new route is being created, the entire procedure for creating a new route file has been built into a computer program (FIG. 5). This computer program includes the map verification as a mandatory step that must be done in order to create the route files and make them available for autonomous playback on a vehicle.

The procedure for creating a route consists of four consecutive steps, from a user's perspective:
1. Choice of file containing route recording data
2. Approval of route points (travel path) in regard to distance to tunnel walls and other obstacles
3. Approval of map representation
4. Naming the route In the first step of route generation, the user indicates which file containing route recording data will be used to generate the map representation and the route points describing the travel path. Next, from the selected route recording data, one creates a map representation and route points, and the program moves on to the second step.

In the second step, information is presented to the user, who decides whether to approve or reject the travel path with respect to the fact that it passes too close in some places to a wall or other obstacle. If the user rejects the travel path, the route generation process is terminated. If, instead, the user approves the generated travel path, an automatic verification of the maps is commenced according to the present invention, and the program moves on to the third step.

In the third step, the result of the map verification is presented to the user, who can decide to approve or reject the reliability of the map representation. If the user rejects the map representation, the route generation processes are stopped. On the other hand, if the user approves the map representation, the program moves on to the fourth and last step.

In the fourth step, the user names the generated route. Only after this is done are the route files created that are designed to be used by an autonomous vehicle to navigate along the recorded travel path. The route generation then finishes automatically.

The invention claimed is:

1. A method for calculating a conformity between an estimated representation of an environment and an actual environment, wherein said representation of the environment constitutes a representation in at least two dimensions, where a distance between two points in the representation has a known relation to the corresponding distance in said environment, wherein the method comprises
   estimating a first position for a point on a vehicle in said representation of the environment based on a mathematical model of the vehicle and stored data and, calculating a first set of expected parameter values for said first estimated position in said representation of the environment,
   comparing said computed first set of expected parameter values with a second set of stored parameter values, where said second set of stored parameter values has been determined for a second position, where said second position constitutes a position in said environment that essentially corresponds to said first estimated position, and
   using said comparison for calculating a measure of a conformity between said actual environment and said representation of the environment.

2. A method according to claim 1, wherein said first set of expected parameter values is a set of distances from one or more points on said vehicle in one or more different directions to surrounding obstacles in said representation of the environment, and wherein said second set of stored parameter values is a set of distances from corresponding said points in one or more corresponding different directions to surrounding obstacles in the environment.

3. A method according to claim 1, including the step of determining said measure of a conformity between said environment and said representation of the environment for a plurality of positions in said representation of said environment and in said environment, respectively.

4. A method according to claim 1, wherein the step of determining said measure includes determining said measure based on a difference between said first set of parameter values and said determined second set of parameter values.

5. A method according to claim 1, including the step of determining said second set of parameter values from one or more sensors arranged on a vehicle or a machine.

6. A method according to claim 1, including the step of determining said first set of expected parameter values by beam tracking based on following the path of a simulated laser beam from a source until an obstacle hinders its propagation in said representation of the environment.

7. Use of the method according to claim 1 for autonomous driving of a vehicle in an environment, wherein a map of the environment is generated, verification that the generated map of the environment agrees with the environment is thereafter automatically accomplished by a computer program, and the vehicle is thereafter autonomously driven in the corresponding environment.

8. Use according to claim 7, wherein the same information as used to generate the map is used to verify that the map is of good quality.

9. A method according to claim 2, including the step of determining said measure of a conformity between said environment and said representation of the environment for a plurality of positions in said representation of said environment and in said environment, respectively.

10. An arrangement for determining a conformity between an estimated representation of an environment and an actual environment, wherein said representation of the environment constitutes a representation in at least two dimensions, where a distance between two points in the representation has a known relation to a corresponding distance in reality, wherein said arrangement comprises:
- means for estimating a first position for a point on a vehicle in said representation of the environment based on a mathematical model of the vehicle and stored data, and, calculating a first set of expected parameter values for said first estimated position in said representation of the environment,
- comparing said first set of expected parameter values with a second set of stored parameter values, where said second set of stored parameter values has been determined for a second position, where said second position constitutes a position in said environment that essentially corresponds to said first estimated position, and
- computing a measure of a conformity between said actual environment and said representation of the environment based on said comparison.

11. An arrangement according to claim 10, wherein said first set of expected parameter values is designed to be a set of distances from one or more points on said vehicle in one or more different directions to surrounding obstacles in said representation of the environment, and wherein said second set of stored parameter values is a set of distances from corresponding said points in one or more corresponding different directions to surrounding obstacles in the environment.

12. An arrangement according to claim 10, wherein said representation of the environment comprises a representation of cavities in rock underground and/or boundary surfaces between rock and tunnels or other type of empty space underground.

13. An arrangement according to claim 10, wherein a plurality of measures for said conformity is determined for a plurality of consecutive time points and/or positions, wherein said measure is based on said plurality of measures.

14. An arrangement according to claim 13, wherein said measure for said conformity consists of the least value of said plurality of consecutive measures.

15. An arrangement according to claim 13, wherein said measure for said conformity consists of a mean value of said plurality of consecutive measures.

16. An arrangement according to claim 10, wherein said second set of parameter values is determined from one or more sensors arranged on a vehicle or a machine.

17. An arrangement according to claim 16, wherein said vehicle or machine is a mining and/or construction machine designed for autonomous movement.

18. A mining and/or construction machine, wherein said machine comprises an arrangement according to claim 10.

19. An arrangement according to claim 11, wherein said representation of the environment comprises a representation of cavities in rock underground and/or boundary surfaces between rock and tunnels or other type of empty space underground.

20. An arrangement according to claim 11, wherein a plurality of measures for said conformity is determined for a plurality of consecutive time points and/or positions, wherein said measure is based on said plurality of measures.

* * * * *